(12) United States Patent
Wiseman

(10) Patent No.: US 6,466,457 B1
(45) Date of Patent: Oct. 15, 2002

(54) TWO SWITCH WIDE RANGE CONVERTER

(75) Inventor: Steven L. Wiseman, Redondo Beach, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/038,432

(22) Filed: Jan. 4, 2002

(51) Int. Cl.[7] .................... H02M 3/335; H02M 7/538
(52) U.S. Cl. ...................... 363/16; 363/25; 363/133
(58) Field of Search ........................ 363/16, 17, 20, 363/24, 25, 132, 133

(56) References Cited

U.S. PATENT DOCUMENTS

| | | | | |
|---|---|---|---|---|
| 3,925,715 A | * | 12/1975 | Venable | 363/26 |
| 4,943,903 A | * | 7/1990 | Cardwell, Jr. | 323/263 |
| 5,504,418 A | * | 4/1996 | Ashley | 136/293 |
| 5,691,627 A | * | 11/1997 | Shum | 323/222 |
| 6,018,469 A | * | 1/2000 | Poon | 363/131 |
| 6,353,294 B1 | * | 3/2002 | Wammes et al. | 315/246 |

* cited by examiner

*Primary Examiner*—Bao Q. Vu
(74) *Attorney, Agent, or Firm*—Gates & Cooper LLP

(57) ABSTRACT

The present invention provides a power converter and a method for converting power. The power converter comprises an inductor, a transformer, first and second switches, a diode, and a full bridge. The inductor comprises a first winding, a second winding, and a third winding, and is coupled to an input voltage. The transformer has a first primary winding coupled to the first winding of the inductor, a second primary winding coupled to the second winding of the inductor, and a third primary winding coupled to the third winding of the inductor. The first switch is coupled to the first primary winding of the transformer, and the second switch is coupled to the second primary winding of the transformer. The diode is coupled to the third primary winding of the transformer. The full bridge is coupled to a secondary winding of the transformer, and the output voltage emanates therefrom.

12 Claims, 6 Drawing Sheets

TWO SWITCH WIDE RANGE CONVERTER

BACKGROUND OF THE INVENTION

1. Field of the Invention

This invention relates in general to electronic assemblies, and, in particular, to a two switch, wide range converter.

2. Description of Related Art

DC voltage to DC voltage converters (DC-to-DC) have found many applications in electronic assemblies. One example of a DC-to-DC converter is a converter known as a "Venable" converter, which is disclosed in U.S. Pat. No. 3,925,715. The Venable converter requires four switching devices or transistors, a diode, an inductor, and a high voltage transformer.

Other DC-to-DC converter circuits are also known. One example is disclosed in U.S. Pat. No. 4,943,903, which is incorporated by reference herein. The Cardwell converter requires 4 switches, one inductor, an adder transformer, and a high voltage transformer.

Since each component used in the DC-DC converter can represent a single point of failure, all other things equal, the reliability of the DC-DC converter goes down as the component or part count of the converter goes up. Increased part count also typically results in greater mass. Reliable operation is critical in many applications, including spacecraft applications. Further, additional parts increase the weight of such spacecraft, which increases the costs of the satellite in terms of launch costs, testing, and certification of all of the parts in the converter assembly.

There is therefore a need in the art for a DC-to-DC converter that requires fewer parts than the converters of the related art. There is also a need in the art for a DC-to-DC converter that has a reduced weight compared to that of the related art. There is also a need in the art for a DC-to-DC converter that can operate over a very large change in the converter input voltage.

SUMMARY OF THE INVENTION

To overcome the limitations in the prior art described above, and to overcome other limitations that will become apparent upon reading and understanding the present specification, the present invention discloses a power converter and a method for converting power. The power converter comprises an inductor, a transformer, first and second switches, a diode, and a full bridge. The inductor comprises a first winding, a second winding, and a third winding, and is coupled to an input voltage. The transformer has a first primary winding coupled to the first winding of the inductor, a second primary winding coupled to the second winding of the inductor, and a third primary winding coupled to the third winding of the inductor. The first switch is coupled to the first primary winding of the transformer, and the second switch is coupled to the second primary winding of the transformer. The diode is coupled to the third primary winding of the transformer. The full bridge is coupled to a secondary winding of the transformer, and the output voltage emanates therefrom.

A method in accordance with the present invention comprises the steps of switching a first switch that is series coupled to a first primary winding of a transformer and a first winding of an inductor, switching a second switch that is series coupled to a second primary winding of the transformer and a second winding of the inductor, coupling a diode to a third primary winding of the transformer and a third winding of the inductor, and coupling a full bridge to a secondary winding of the transformer, wherein the transformer, inductor, first switch, second switch, diode, and full bridge convert the input voltage coupled to the inductor to an output voltage emanating from the full bridge.

The present invention provides a DC-to-DC converter that requires fewer parts than the converters of the related art. The present invention also provides a DC-to-DC converter that has a reduced weight compared to that of the related art. The present invention also provides a DC-to-DC converter can operate over a very wide variation in the input voltage. For example, the present invention can operate with input voltage variations of 4:1. This would allow the converter to provide a fully regulated output with an input voltage variation from 25 VDC to 100 VDC. Theoretically, the input voltage variation can be much greater, but practical limitations due to component voltage ratings may ultimately limit the maximum input voltage range.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Overview

This invention is a current fed converter which can be implemented with a minimum number of parts. Because this converter uses a minimum number of parts, it can be very reliable and have low mass. The converter of the present invention processes power in such a way that it can be very efficient, and it also has the capability to operate over a very wide input voltage range. Even though this converter operates as a continuous conduction mode boost converter, the converter of the present invention has buck converter control characteristics, and as a result does not have a right half plane zero in the control to output transfer function.

The converter of the present invention can process power as efficiently as previous circuits but requires fewer parts than the related art, and therefore can be more reliable and lower in cost.

The converter of the present invention can be used to provide multiple output voltages from a single DC input voltage. The converter of the present invention can also be used to provide high output voltages for traveling wave tubes (TWTs). Because it can be optimized for high efficiency and low mass/weight, it is applicable for satellite power applications. Since it can operate over wide variations in input DC voltages, it can also be used in applications where other converters cannot be used.

As discussed with respect to FIG. 1, related art switching converters require four switches, and other related circuit elements, including a high voltage transformer. The Venable and Cardwell converters are examples of related art converters.

The converter of the present invention requires only two switches, one diode, one inductor, and a high voltage transformer. However, the present invention provides similar outputs to that of the related art. As such, the converter of the present invention provides similar results with fewer parts than approaches in the related art.

Two-Switch Converter

Figure 1A:
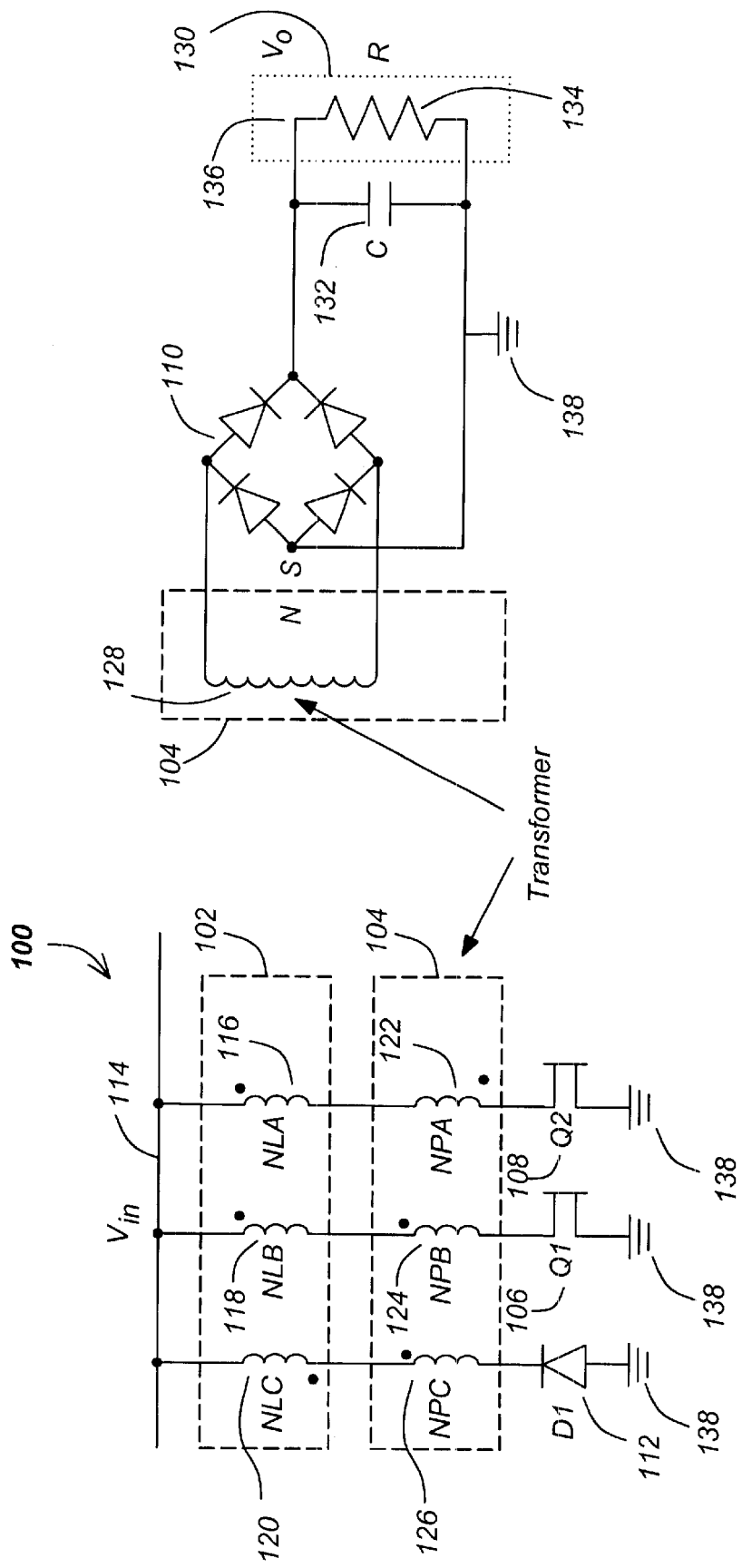
FIG. 1A illustrates the converter of the present invention.

FIG. 1A illustrates the converter of the present invention.

Converter 100, as shown in FIG. 1A, comprises inductor 102, transformer 104, switch Q1 106, switch Q2 108, full bridge 110 and diode D1 112. Inductor 102 is coupled to input voltage 114, and is also coupled to transformer 104. Transformer 104 is coupled to Q1 106, Q2 108, full bridge 110 and D1 112 as shown.

Although the couplings shown in FIG. 1A are direct couplings, additional parts or circuit elements can be placed between inductor 102 and transformer 104, or between any of the other circuit elements shown in FIG. 1A, for other purposes, e.g., filtering, etc. without departing from the scope of the present invention. The couplings shown in FIG. 1A are for communicating between circuit elements and/or for transferring current or electrons between circuit elements, and are not meant to be limited to direct mechanical couplings.

Inductor 102 comprises three different inductive winding, winding NLA 116, winding NLB 118, and winding NLC 120. In one embodiment, the inductor 102 is a single component part. Transformer 104 has three primary windings, winding NPA 122, winding NPB 124, and winding NPC 126, and a secondary winding 128. Load 130 is coupled to capacitor 132. Load 130 comprises resistive component 134 or any other type of electronic load. Output voltage 136 of converter 100 is shown at the top of resistive component 134, as emanating from full bridge 110 filtered by capacitor 132. Ground 138 is shown coupled to the bottom of resistive component 134, as well as to Q1 106, Q2 108, and D1 112.

By solving the circuit of converter 100 shown in FIG. 1A for the volt-seconds/turn balance on the inductor 102 over one complete switching cycle, the following expression is derived:

$$V_0 = \frac{NS\left(D\left(\frac{1}{NLA} + \frac{1}{NLC}\right) + \frac{1}{NLB} - \frac{1}{NLC}\right)}{\left(\frac{NPC}{NLC} + \frac{NPB}{NLB}\right)} V_{in} \quad \text{Equation (1)}$$

where $$\frac{NPA}{NLA} = \frac{NPC}{NLC}$$

and

NLC>NLB.

$D=T_{on}/(T_{on}+T_{off})$, where $D$ is the duty cycle of the converter 100.

D can vary from zero to one. When D=0, Q2 is always off. When D=1, Q2 is on for the maximum on time of Q2, as shown in FIG. 1B.

Figure 1B:
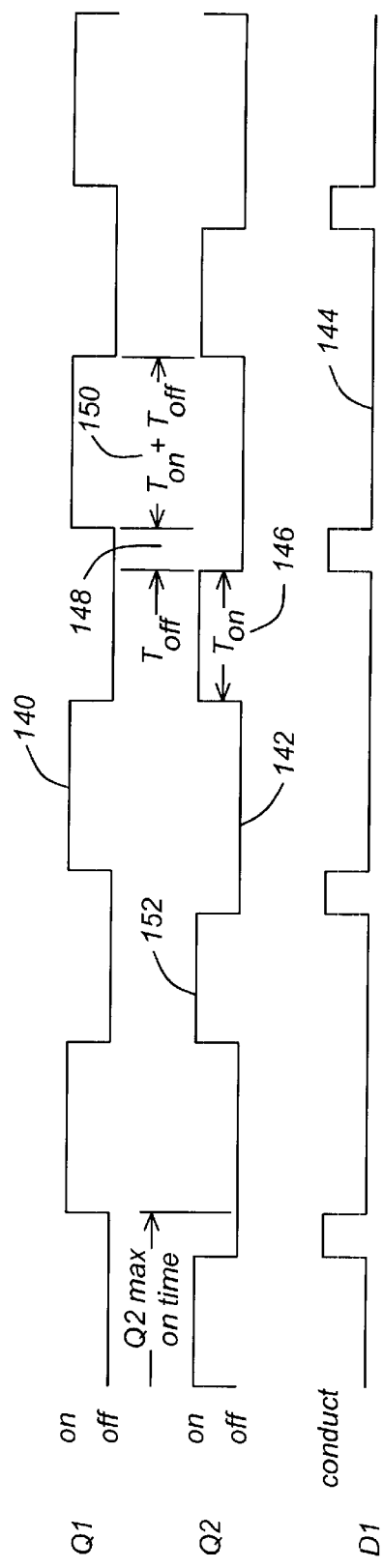
FIG. 1B illustrates the timing diagram associated with the converter of the present invention.

FIG. 1B shows the basic timing diagram of the converter where Q1 106 is switched at a constant 50% duty cycle, and Q2 108 is pulse width modulated. D1 112 always conducts when both Q1 and Q2 are off.

Timing line 140 illustrates a fifty percent duty cycle for Q1 106. Timing line 142 shows the pulse width modulated signal for Q2 108. Timing line 144 illustrates the conduction of D1 112. To determine the duty cycle for the converter 100, $T_{on}$ 146, $T_{off}$ 148, and $T_{on}+T_{off}$ 150 are shown. Further, pulse 152 is shown as a certain time period, but can be longer or shorter, since the pulse 152 is pulse width modulated.

By manipulating equation (1) and assuming that NLB has been made very nearly equal to ALC, the following approximation can be derived $$V_o \cong \frac{N_S D\left(\frac{NLB}{NLA} + 1\right) V_{in}}{NPC + NPB}$$

Evaluating this equation at D=1, $V_{in}$=10 VDC, and if the quantity $$\frac{N_S\left(\frac{NLB}{NLA} + 1\right)}{NPC + NPB} = \text{Turns Ratio Quantity}$$

is designed to be equal to 10, then $V_o$=100 VDC.

If $V_o$ is maintained at 100 VDC, the turns ratio quantity will remain equal to 10, but D is now set equal to 0.1, $V_{in}$ must now be equal to 100 VDC to maintain $V_o$=100 VDC.

Since the goal is to regulate $V_o$ and keep it constant, this can be accomplished by varying the quantity D from 0.1 to 1.0, even if $V_{in}$ changes from 100 VDC to 10 VDC. Therefore, for this set of parameters, $V_{in}$ can vary from 10 VDC to 100 VDC, a ratio of 10:1.

The converter 100 can best be understood by examining how it operates at two extreme limits of operation, i.e., where Q2 108 is on for a maximum time, and where Q2 is on for a minimum time.

Maximum On-Time for Q2

Figure 2:
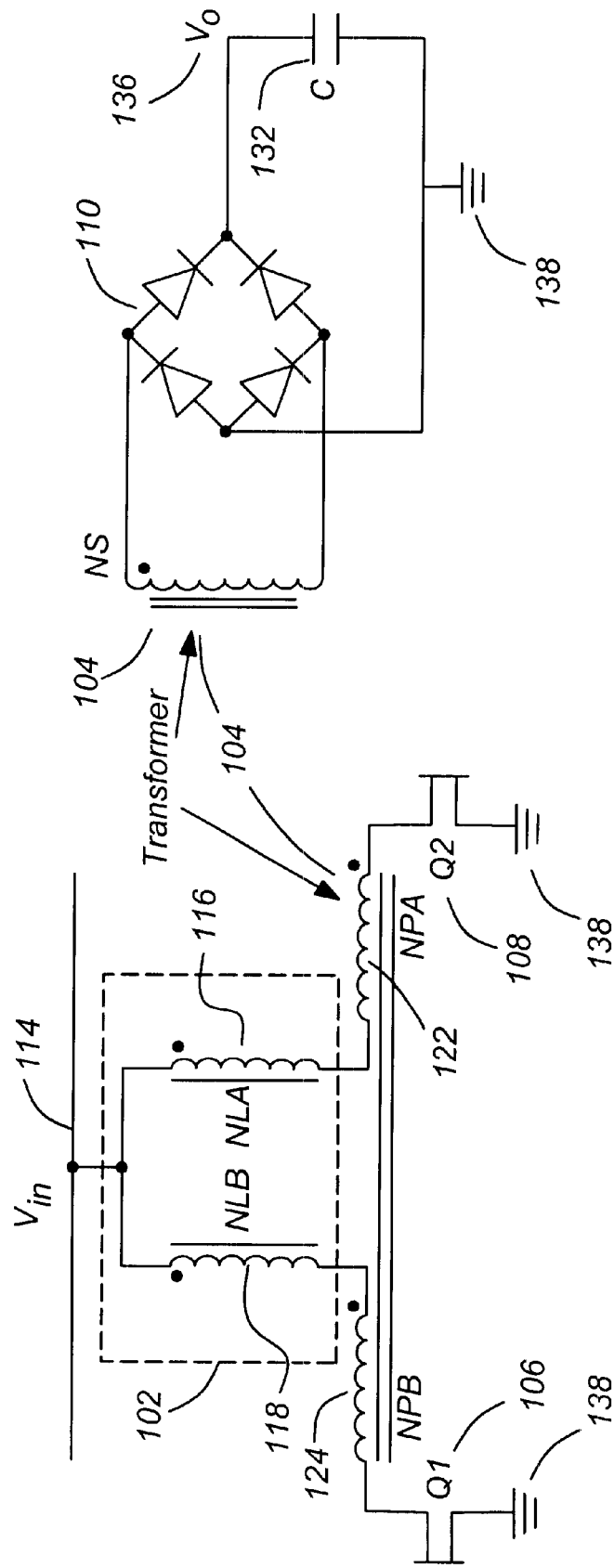
FIG. 2 represents the effective circuit diagram of the converter of the present invention when it operates at the maximum on time of the pulse width modulated switch Q2.

FIG. 2 represents the effective circuit diagram of the converter of the present invention when it operates at the maximum on time of the pulse width modulated switch Q2 108. When Q2 108 is at its maximum on-time, D1 112 never conducts because Q1 106 and Q2 108 are each being switched at a fixed 50% duty cycle, and therefore D1 112 never passes any current, since D1 112 can only pass current when Q2 108 and Q1 106 are both off.

The converter 100 can operate highly efficiently when Q2 108 is at its maximum on-time. As long as the following relationship applies, during this mode of operation:

$$\frac{NLA}{NLB} = \frac{NPA}{NPB},$$

there will be a volt-second balance on the inductor 102 and the transformer 104.

Minimum On-Time for Q2

Figure 3:
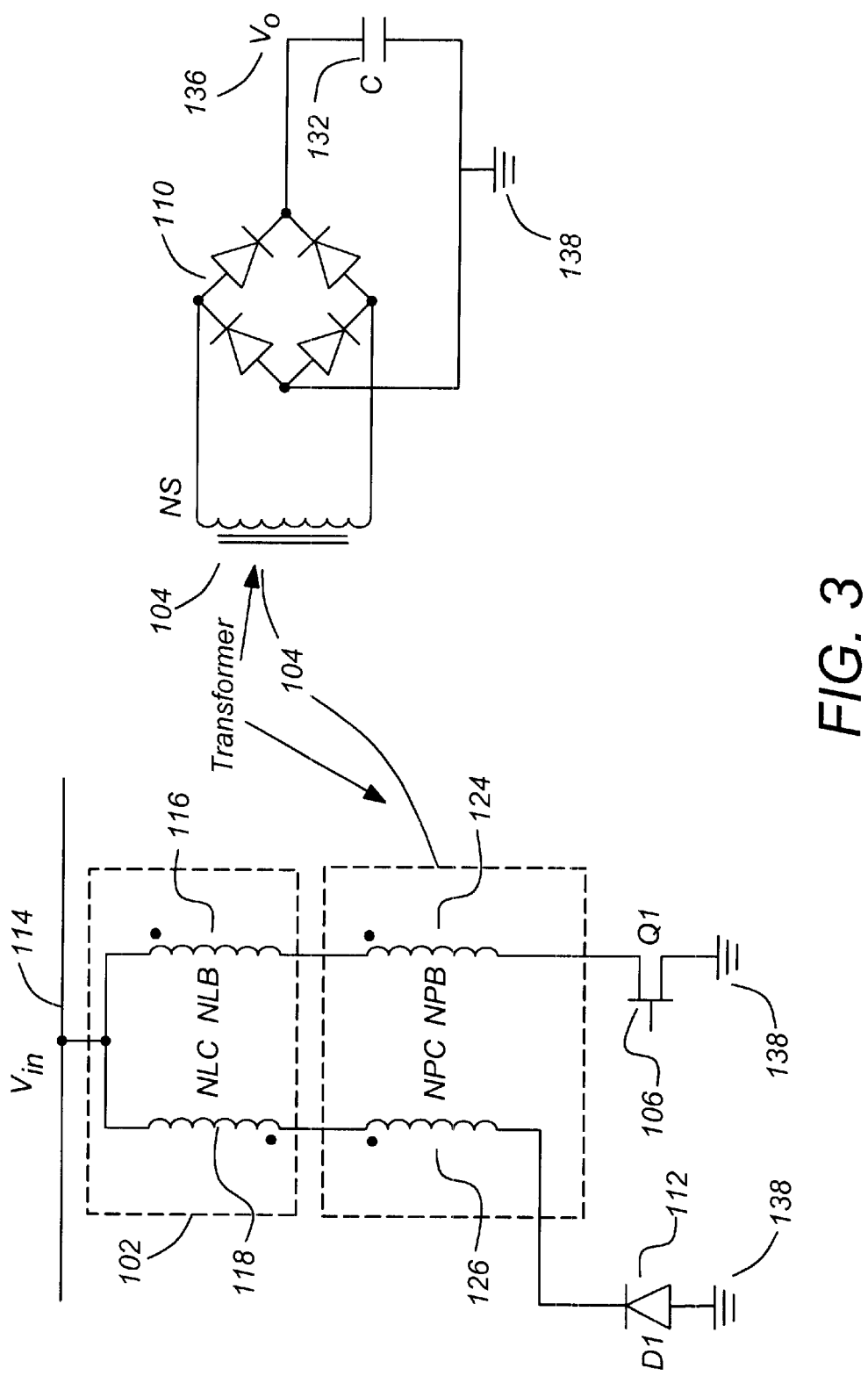
FIG. 3 represents the effective circuit diagram of the converter of the present invention when it operates at the minimum on time for Q2, i.e., Q2 is always off.

FIG. 3 represents the effective circuit diagram of the converter of the present invention when it operates at the minimum on time for Q2, i.e., Q2 is always off.

When Q2 108 is always off, and Q1 106 is constantly switched at a fixed 50% duty cycle, D1 112 conducts during the off-time of Q1 106.

To create a volt-second balance on inductor 102 and transformer 104, the following relationship must exist during this mode of operation:

$$\frac{NLB}{NLC} = \frac{NPB}{NPC}$$

The following expression gives the output voltage 136 during this mode of operation:

$$V_0 = V_{IN}\left(\frac{1}{2}\left(\frac{NLC}{NLB}+1\right)-1\right)\frac{NS}{NPC}$$

By selecting the appropriate number of turns for the inductor 202 and transformer 204, the converter 200 can be optimized for any type of input line voltage 214 or output voltage 236 requirements.

Alternative Inductor Winding Configuration

Figure 4:
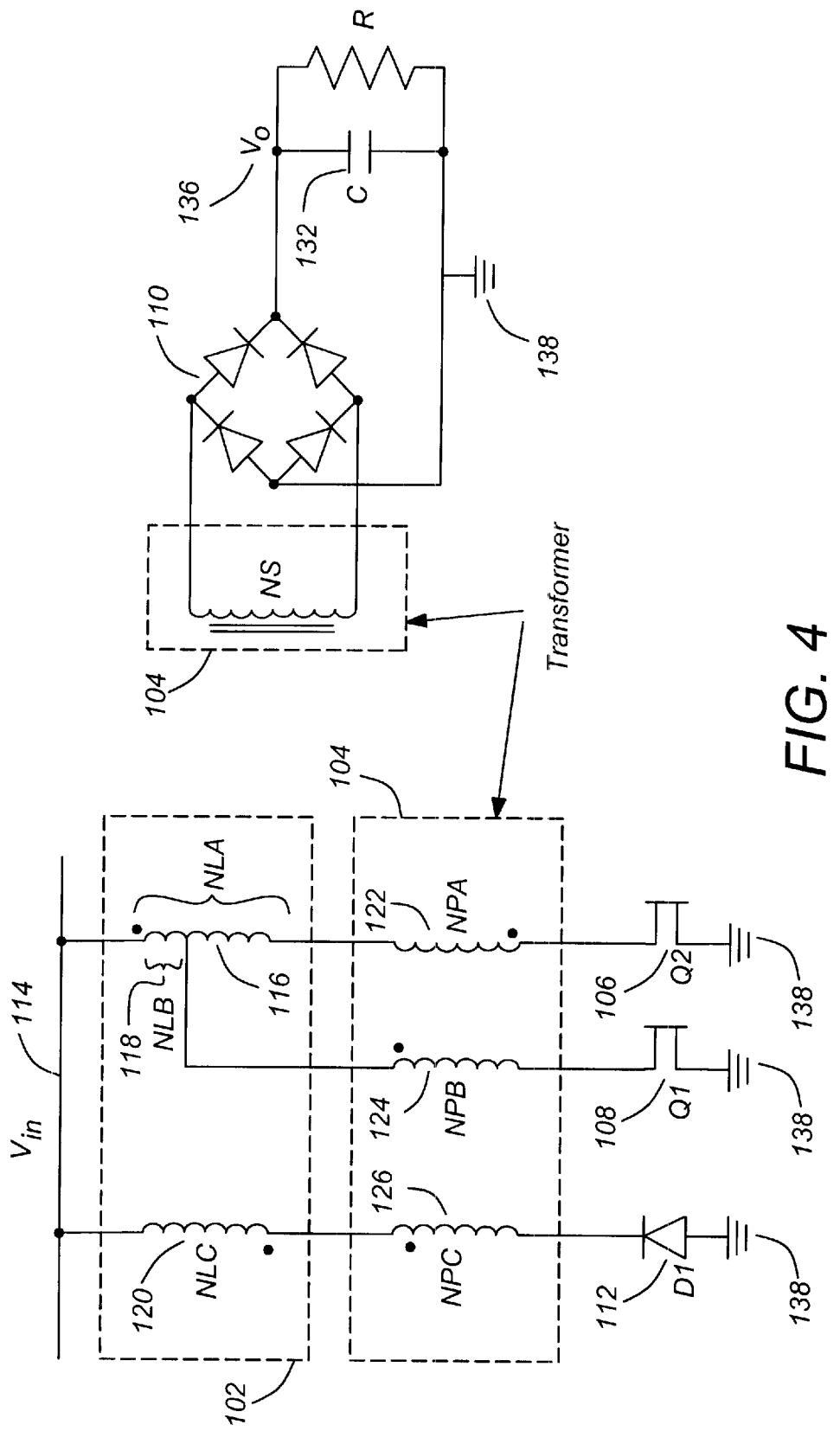
FIG. 4 illustrates an alternative winding configuration for the converter of the present invention.

FIG. 4 illustrates an alternative winding configuration for the converter of the present invention. Inductor 102 comprises two windings NLC 120 and NLA 116. Winding NLB 118 is a subset of winding NLA 116, which subset is performed using a wiper or other variable tap from winding NLA 116 to create winding NLB 118.

Process Chart

Figure 5:
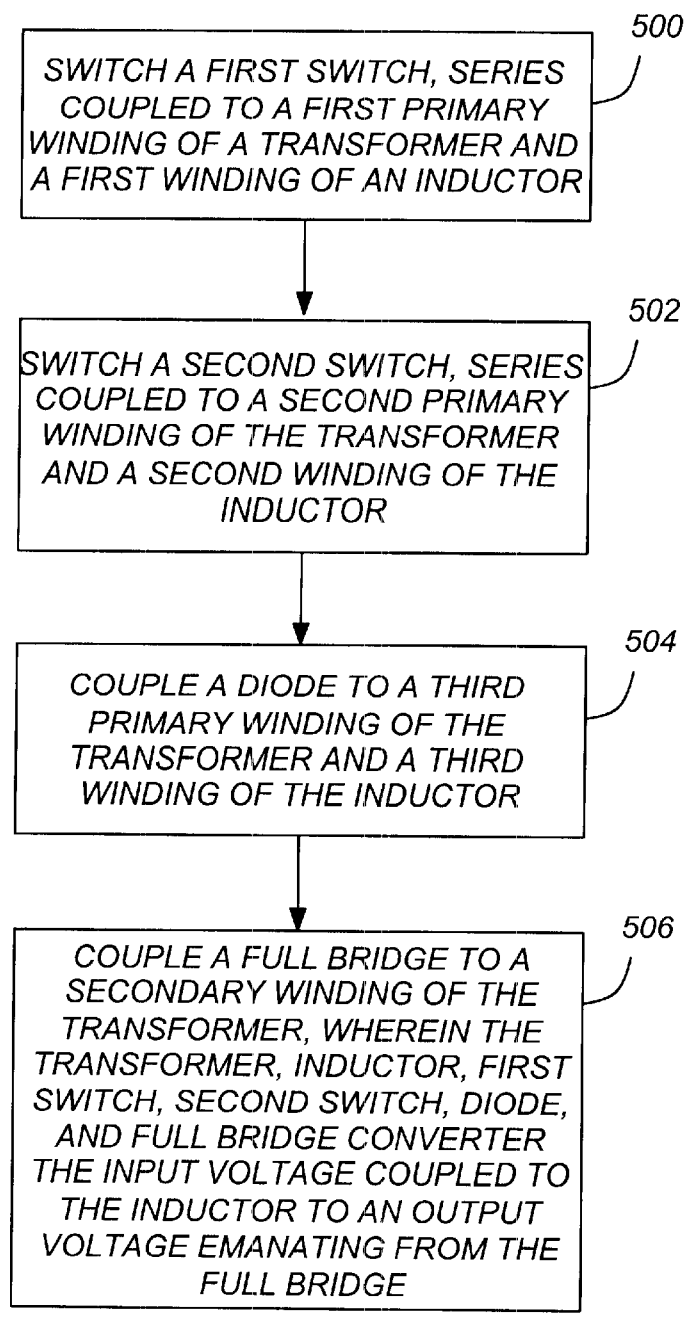
FIG. 5 is a flow chart illustrating the steps used in practicing one embodiment of the present invention.

FIG. 5 is a flowchart illustrating the steps used to practice one embodiment of the present invention.

Block 500 illustrates performing the step of switching a first switch, series coupled to a first primary winding of a transformer and a first winding of an inductor.

Block 502 illustrates performing the step of switching a second switch, series coupled to a second primary winding of the transformer and a second winding of the inductor.

Block 504 illustrates performing the step of coupling a diode to a third primary winding of the transformer and a third winding of the inductor.

Block 506 illustrates performing the step of coupling a full bridge to a secondary winding of the transformer, wherein the transformer, inductor, first switch, second switch, diode, and full bridge convert the input voltage coupled to the inductor to an output voltage emanating from the fill bridge.

The following paragraphs describe some alternative methods of accomplishing the same objects and some additional advantages for the present invention. Although Q1 106 and Q2 108 are shown as field effect transistors, other types of transistors, such as bipolar junction transistors, can be used for Q1 106 and Q2 108 without departing from the scope of the present invention. D1 112 can also be a transistor or other circuit element that acts as a diode without departing from the scope of the present invention.

In summary, the present invention provides a power converter and a method for converting power. The power converter comprises an inductor, a transformer, first and second switches, a diode, and a full bridge. The inductor comprises a first winding, a second winding, and a third winding, and is coupled to an input voltage. The transformer has a first primary winding coupled to the first winding of the inductor, a second primary winding coupled to the second winding of the inductor, and a third primary winding coupled to the third winding of the inductor. The first switch is coupled to the first primary winding of the transformer, and the second switch is coupled to the second primary winding of the transformer. The diode is coupled to the third primary winding of the transformer. The fill bridge is coupled to a secondary winding of the transformer, and the output voltage emanates therefrom.

A method in accordance with the present invention comprises the steps of switching a first switch that is series coupled to a first primary winding of a transformer and a first winding of an inductor, switching a second switch that is series coupled to a second primary winding of the transformer and a second winding of the inductor, coupling a diode to a third primary winding of the transformer and a third winding of the inductor, and coupling a full bridge to a secondary winding of the transformer, wherein the transformer, inductor, first switch, second switch, diode, and full bridge convert the input voltage coupled to the inductor to an output voltage emanating from the full bridge.

The foregoing description of the preferred embodiment of the invention has been presented for the purposes of illustration and description and is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A power converter, comprising:

an inductor, comprising a first winding, a second winding, and a third winding, coupled to an input voltage;

a transformer, wherein a first primary winding is coupled to the first winding of the inductor, a second primary winding is coupled to the second winding of the inductor, and a third primary winding is coupled to the third winding of the inductor;

a first switch coupled to the first primary winding of the transformer;

a second switch coupled to the second primary winding of the transformer;

a diode coupled to the third primary winding of the transformer; and a full bridge, coupled to a secondary winding of the transformer.

2. The power converter of claim 1, wherein the first switch and the second switch are selected from a group comprising bipolar junction transistors and field effect transistors.

3. The power converter of claim 1, wherein the first switch is switched at a fifty percent duty cycle and the second switch is pulse width modulated.

4. The power converter of claim 1, further comprising a capacitor coupled to the full bridge.

5. The power converter of claim 1, wherein the diode conducts current only when both the first switch and the second switch are turned off.

6. The power converter of claim 1, wherein the second winding of the inductor is a subset of the first winding of the inductor.

7. A method for converting an input voltage to an output voltage, comprising the steps of:

switching a first switch, series coupled to a first primary winding of a transformer and a first winding of an inductor;

switching a second switch, series coupled to a second primary winding of the transformer and a second winding of the inductor; and coupling a diode to a third primary winding of the transformer and a third winding of the inductor; and coupling a full bridge to a secondary winding of the transformer, wherein the transformer, inductor, first switch, second switch, diode, and full bridge convert the input voltage coupled to the inductor to an output voltage emanating from the full bridge.

8. The method of claim 7, wherein the first switch and the second switch are selected from a group comprising bipolar junction transistors and field effect transistors.

9. The method of claim 7, wherein the first switch is switched at a fifty percent duty cycle and the second switch is pulse width modulated.

10. The method of claim 7, further comprising coupling a capacitor to the full bridge for filtering the output voltage emanating from the full bridge.

11. The method of claim 7, wherein the diode conducts current only when both the first switch and the second switch are turned off.

12. The method of claim 7, wherein the second winding of the inductor is a subset of the first winding of the inductor.

* * * * *